United States Patent
Vaishampayan et al.

(10) Patent No.: US 11,415,482 B2
(45) Date of Patent: Aug. 16, 2022

(54) WATER INTRUSION COVER FOR SENSOR PROBE

(71) Applicant: Cummins Emission Solutions Inc., Columbus, IN (US)

(72) Inventors: Advait Sunil Vaishampayan, Pune (IN); Samantha Stang, Indianapolis, IN (US); Sachin Sharma, Pune (IN); Srinivasan Balu, Tamil Nadu (IN); Tushar Ravindra Dhinge, Yeola (IN)

(73) Assignee: Cummins Emission Solutions Inc., Columbus, IN (US)

( * ) Notice: Subject to any disclaimer, the term of this patent is extended or adjusted under 35 U.S.C. 154(b) by 190 days.

(21) Appl. No.: 17/001,944

(22) Filed: Aug. 25, 2020

(65) Prior Publication Data
US 2021/0063278 A1 Mar. 4, 2021

Related U.S. Application Data

(60) Provisional application No. 62/892,120, filed on Aug. 27, 2019.

(51) Int. Cl.
| | |
|---|---|
| *G01M 15/02* | (2006.01) |
| *G01M 15/10* | (2006.01) |
| *F01N 3/20* | (2006.01) |
| *F01N 11/00* | (2006.01) |

(52) U.S. Cl.
CPC .......... *G01M 15/02* (2013.01); *G01M 15/102* (2013.01); *F01N 3/2066* (2013.01); *F01N 11/00* (2013.01); *F01N 2560/02* (2013.01); *F01N 2560/05* (2013.01)

(58) Field of Classification Search
CPC .... F01N 3/2066; F01N 11/00; F01N 2560/02; F01N 2560/05; G01M 15/02; G01M 15/102
USPC ................................ 60/276, 301; 73/114.69
See application file for complete search history.

(56) References Cited

U.S. PATENT DOCUMENTS

| | | | |
|---|---|---|---|
| 8,016,989 B2 | 9/2011 | Tsukahara et al. | |
| 8,679,584 B2 | 3/2014 | Anfang et al. | |
| 10,047,655 B2 | 8/2018 | Wadke et al. | |
| 2010/0000290 A1 | 1/2010 | Goya | |
| 2014/0223887 A1* | 8/2014 | Duault | F01N 11/00 60/274 |

(Continued)

FOREIGN PATENT DOCUMENTS

| | | |
|---|---|---|
| DE | 102018102260 A1 | 8/2018 |
| DE | 102018102274 A1 | 8/2018 |

*Primary Examiner* — Jorge L Leon, Jr.
(74) *Attorney, Agent, or Firm* — Foley & Lardner LLP

(57) ABSTRACT

A water intrusion cover for a sensor probe in an exhaust system is provided. The water intrusion cover includes a main body portion having a substantially cylindrical shape, an inlet opening, and an outlet opening. The inlet opening and outlet opening are formed in a sidewall of the main body portion and are fluidly coupled to form a continuous flow path defined by a surface that, in a cross-section perpendicular to an axis of the main body portion, curves from the inlet opening to the outlet opening. The water intrusion cover further includes a shoulder portion having a substantially cylindrical shape. The main body portion and the shoulder portion collectively define a central passage for the sensor probe.

18 Claims, 8 Drawing Sheets

(56) References Cited

U.S. PATENT DOCUMENTS

| | | | |
|---|---|---|---|
| 2015/0260687 A1* | 9/2015 | Kinoshita | G01N 29/32 |
| | | | 73/61.79 |
| 2015/0355067 A1* | 12/2015 | Zhang | G01N 15/0656 |
| | | | 73/23.31 |
| 2016/0131013 A1* | 5/2016 | Yi | F01N 13/08 |
| | | | 60/276 |
| 2016/0305297 A1* | 10/2016 | Wadke | G01D 11/245 |
| 2017/0130638 A1* | 5/2017 | Kotynek | F01N 13/18 |
| 2018/0217089 A1 | 8/2018 | Kimiya et al. | |
| 2018/0217090 A1 | 8/2018 | Kimiya et al. | |
| 2021/0381945 A1* | 12/2021 | Tam | G01M 15/102 |

* cited by examiner

WATER INTRUSION COVER FOR SENSOR PROBE

CROSS-REFERENCE TO RELATED APPLICATIONS

The present application claims the benefit of U.S. Provisional Application No. 62/892,120, filed Aug. 27, 2019, the entire disclosure of which is hereby incorporated by reference herein.

TECHNICAL FIELD

The present application relates generally to the field of sensor systems for exhaust systems. More specifically, the present application relates to a water intrusion cover for a sensor probe in an exhaust system.

BACKGROUND

For internal combustion engines, such as diesel or natural gas engines, nitrogen oxide ($NO_x$) compounds may be emitted in the exhaust of a vehicle. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber.

SUMMARY

In one embodiment, a water intrusion cover for a sensor probe in an exhaust system is provided. The water intrusion cover includes a main body portion having a substantially cylindrical shape, an inlet opening, and an outlet opening. The inlet opening and outlet opening are formed in a sidewall of the main body portion and are fluidly coupled to form a continuous flow path defined by a surface that, in a cross-section perpendicular to an axis of the main body portion, curves from the inlet opening to the outlet opening. The water intrusion cover further includes a shoulder portion having a substantially cylindrical shape. The main body portion and the shoulder portion collectively define a central passage for the sensor probe.

In some embodiments, the water intrusion cover further includes a mounting flange integrally coupled to the main body portion and the shoulder portion and situated between the main body portion and the shoulder portion.

In some embodiments, a cross-sectional area of the inlet opening is equal to a cross-sectional area of the outlet opening. In some embodiments, a cross-sectional area of the inlet opening is smaller than a cross-sectional area of the outlet opening.

In some embodiments, an angle between a centerline of the inlet opening and a centerline of the outlet opening is in a range of 110 degrees to 120 degrees. In other embodiments, the main body portion further includes a relief hole formed through a sidewall of the main body portion. In still further embodiments, the centerline of the inlet opening and a centerline of the relief hole are substantially parallel. In some embodiments, the main body portion comprises a curved first surface and a curved second surface opposite the curved first surface, the flow path being bound by the curved first surface and curved second surface.

In some embodiments, an exhaust pipe assembly comprises: an exhaust pipe; and a water intrusion cover for a sensor probe configured to be coupled to a wall of the exhaust pipe, the water intrusion cover comprising: a main body portion having a substantially cylindrical shape and comprising an inlet opening and an outlet opening formed in a sidewall of the main body portion, the inlet opening and the outlet opening fluidly coupled to form a continuous flow path defined by a surface that, in a cross-section perpendicular to an axis of the main body portion, curves from the inlet opening to the outlet opening; and a shoulder portion having a substantially cylindrical shape; wherein the main body portion and the shoulder portion collectively define a central passage for the sensor probe.

In some embodiments, the water intrusion cover further comprises a mounting flange integrally coupled to the main body portion and the shoulder portion and situated between the main body portion and the shoulder portion.

In some embodiments, a cross-sectional area of the inlet opening is smaller than a cross-sectional area of the outlet opening. In some embodiments, a cross-sectional area of the inlet opening is equal to a cross-sectional area of the outlet opening.

In some embodiments, an angle between a centerline of the inlet opening and a centerline of the outlet opening is in a range of 110 degrees to 120 degrees. In some embodiments, the main body portion further comprises a relief hole formed through a sidewall of the main body portion. In some embodiments, a centerline of the inlet opening and a centerline of the relief hole are substantially parallel. In some embodiments, the main body portion comprises a curved first surface and a curved second surface opposite the curved first surface, the flow path being bound by the curved first surface and curved second surface.

In some embodiments, the exhaust pipe assembly further comprises a rain shield coupled to an interior surface of the exhaust pipe downstream of the water intrusion cover and located over the cover. In some embodiments, the exhaust pipe is configured to be oriented substantially vertically with respect to gravity.

In some embodiments, an aftertreatment system for treating constituents of an exhaust gas generated by an engine comprises: an exhaust pipe assembly, comprising: an exhaust pipe; and a water intrusion cover coupled to a wall of the exhaust pipe, the water intrusion cover comprising: a main body portion having a substantially cylindrical shape and comprising an inlet opening and an outlet opening formed in a sidewall of the main body portion, the inlet opening and the outlet opening fluidly coupled to form a continuous flow path defined by a surface that, in a cross-section perpendicular to an axis of the main body portion, curves from the inlet opening to the outlet opening, and a shoulder portion having a substantially cylindrical shape, the main body portion and the shoulder portion collectively defining a central passage; a sensor disposed through the central passage such that at least a tip of the sensor is disposed within the main body portion; and a selective catalytic reduction catalyst disposed in the exhaust pipe.

In some embodiments, the water intrusion cover is disposed downstream of the selective catalytic reduction catalyst.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
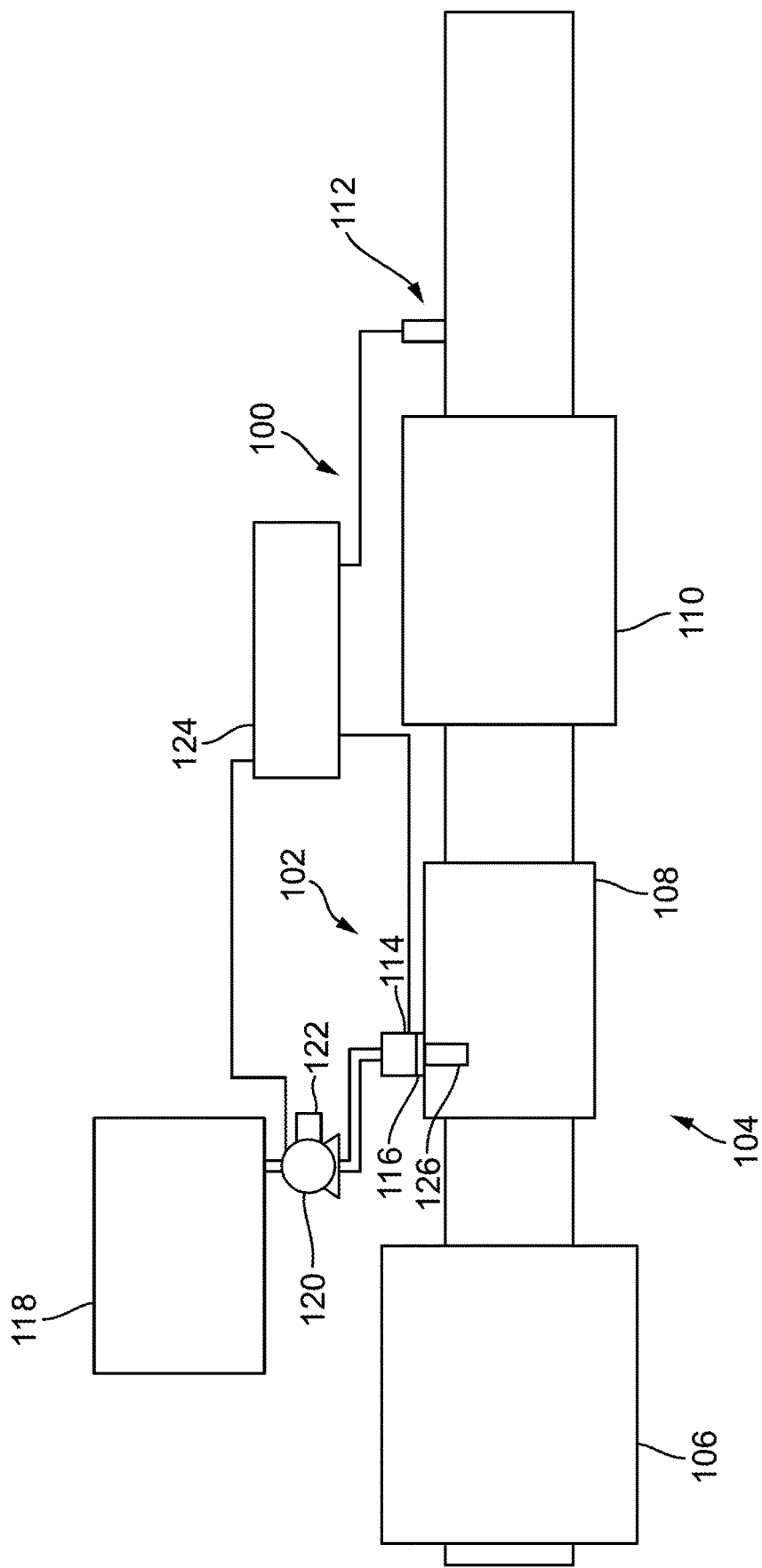
FIG. 1 is a block schematic diagram of an example aftertreatment system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for protecting particulate matter sensors from water intrusion within an aftertreatment system of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some vehicles, such as semi-trailer trucks or tractors, an outlet of an exhaust system is vertical or substantially vertical relative to the vehicle. Thus, an end opening of the exhaust may be open and exposed to the environment, thereby potentially exposing any components within the exhaust system to any environmental conditions. In some exhaust systems, a sensor module may be located downstream of an SCR catalyst to detect one or more emissions in the exhaust flow after the SCR catalyst. For example, a $NO_x$ sensor, a CO sensor, and/or a particulate matter sensor may be positioned downstream of the SCR catalyst to detect $NO_x$, CO, and/or particulate matter within the exhaust gas exiting the exhaust of the vehicle. Such emission sensors may be useful to provide feedback to a controller to modify an operating parameter of the aftertreatment system of the vehicle. For example, a $NO_x$ sensor may be utilized to detect the amount of $NO_x$ exiting the vehicle exhaust system and, if the $NO_x$ detected is too high or too low, the controller may modify an amount of reductant delivered by a dosing module. A CO and/or a particulate matter sensor may also be utilized.

In some implementations, the sensor probe may be located in the vertical portion of the exhaust system of the vehicle. Thus, the sensor probe may be, at least partially, exposed to the environmental conditions that the outlet or end opening of the exhaust system is exposed to, such as rain, snow, hail, etc. For example, fluid may fall into the exhaust outlet and, in some instances, enter the sensor probe, thereby potentially damaging or causing the sensor of the sensor probe to fail. In other instances, fluid may enter the sensor probe in other manners, such as during cleaning of the vehicle. Such fluid intrusion failure modes may be reduced if the fluid is prevented or substantially deflected away from the sensor probe and/or the sensor. In some implementations, a water intrusion cover may be provided with the sensor probe such that the cover deflects liquid away from the sensor, thereby reducing and/or potentially eliminating incidents of fluid intrusion failure modes. In addition, such a cover may be constructed such that exhaust gases that are sensed by the sensor probe are directed to travel in a laminar flow past the sensor probe with sufficient volume and velocity to ensure that the sensing behavior of the sensor probe is not altered due to the presence of the cover. The cover may also include outlets to release gas that enters the cover back into the exhaust gas flow path to prevent gaseous buildup at the sensor.

II. Overview of Aftertreatment System

FIG. 1 depicts an aftertreatment system 100 having an example reductant delivery system 102 for an exhaust system 104. The aftertreatment system 100 also includes a particulate filter (e.g., a diesel particulate filter (DPF) 106, a decomposition chamber 108 (e.g., reactor, reactor pipe, etc.), a SCR catalyst 110, and a sensor 112. In the embodiments disclosed herein, sensor 112 is a particulate matter sensor.

The DPF 106 is configured to (e.g., structured to, able to, etc.) remove particulate matter, such as soot, from exhaust gas flowing in the exhaust system 104. The DPF 106 includes an inlet, where the exhaust gas is received, and an outlet, where the exhaust gas exits after having particulate matter substantially filtered from the exhaust gas and/or converting the particulate matter into carbon dioxide. The particulate matter sensor may estimate the amount of soot accumulated in the DPF 106 in order to monitor the performance of the DPF 106. For example, the data detected by the particulate matter sensor may be used to enable accurate regeneration strategies for the DPF 106 or detect failures in the DPF 106. If a failure in the DPF 106 causes excess particulate matter emissions, the particulate matter sensor may trigger an on-board diagnostic (OBD) fault signal. In some implementations, the DPF 106 may be omitted.

The decomposition chamber 108 is configured to convert a reductant into ammonia. The reductant may be, for example, urea, diesel exhaust fluid (DEF), Adblue®, an urea water solution (UWS), an aqueous urea solution (e.g., AUS32, etc.), and other similar fluids. The decomposition chamber 108 includes a reductant delivery system 102 having a doser or dosing module 114 configured to dose the reductant into the decomposition chamber 108 (e.g., via an injector). In some implementations, the reductant is injected upstream of the SCR catalyst 110. The reductant droplets then undergo the processes of evaporation, thermolysis, and hydrolysis to form gaseous ammonia within the exhaust system 104. The decomposition chamber 108 includes an inlet in fluid communication with the DPF 106 to receive the exhaust gas containing $NO_x$ emissions and an outlet for the exhaust gas, $NO_x$ emissions, ammonia, and/or reductant to flow to the SCR catalyst 110.

The decomposition chamber 108 includes the dosing module 114 mounted to the decomposition chamber 108 such that the dosing module 114 may dose the reductant into the exhaust gases flowing in the exhaust system 104. The dosing module 114 may include an insulator 116 interposed between a portion of the dosing module 114 and the portion of the decomposition chamber 108 on which the dosing module 114 is mounted. The dosing module 114 is fluidly coupled to (e.g., fluidly configured to communicate with, etc.) a reductant source 118. The reductant source 118 may include multiple reductant sources 118. The reductant source 118 may be, for example, a diesel exhaust fluid tank containing Adblue®.

A supply unit or reductant pump 120 is used to pressurize the reductant from the reductant source 118 for delivery to the dosing module 114. In some embodiments, the reductant pump 120 is pressure controlled (e.g., controlled to obtain a target pressure, etc.). The reductant pump 120 includes a filter 122. The filter 122 filters (e.g., strains, etc.) the reductant prior to the reductant being provided to internal components (e.g., pistons, vanes, etc.) of the reductant pump 120. For example, the filter 122 may inhibit or prevent the transmission of solids (e.g., solidified reductant, contaminants, etc.) to the internal components of the reductant pump 120. In this way, the filter 122 may facilitate prolonged desirable operation of the reductant pump 120. In some embodiments, the reductant pump 120 is coupled to a chassis of a vehicle (e.g., maritime vehicle, boat, shipping boat, barge, container ship, terrestrial vehicle, construction vehicle, truck, etc.) associated with the aftertreatment system 100.

The dosing module 114 and reductant pump 120 are also electrically or communicatively coupled to a controller 124. The controller 124 is configured to control the dosing module 114 to dose the reductant into the decomposition chamber 108. The controller 124 may also be configured to control the reductant pump 120. The controller 124 may include a microprocessor, an application-specific integrated circuit (ASIC), a field-programmable gate array (FPGA), etc., or combinations thereof. The controller 124 may include memory, which may include, but is not limited to, electronic, optical, magnetic, or any other storage or transmission device capable of providing a processor, ASIC, FPGA, etc. with program instructions. This memory may include a memory chip, Electrically Erasable Programmable Read-Only Memory (EEPROM), Erasable Programmable Read Only Memory (EPROM), flash memory, or any other suitable memory from which the associated controller can read instructions. The instructions may include code from any suitable programming language.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust system 104.

The exhaust system 104 may further include an oxidation catalyst (e.g., a diesel oxidation catalyst (DOC)) in fluid communication with the exhaust system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 114 may instead be positioned downstream of a turbocharger or upstream of a turbocharger.

The sensor 112 may be coupled to the exhaust system 104 to detect a condition of the exhaust gas flowing through the exhaust system 104. In some implementations, the sensor 112 may have a portion disposed within the exhaust system 104; for example, a tip of the sensor 112 may extend into a portion of the exhaust system 104. In other implementations, the sensor 112 may receive exhaust gas through another conduit, such as one or more sample pipes extending from the exhaust system 104. While the sensor 112 is depicted as positioned downstream of the SCR catalyst 110, it should be understood that the sensor 112 may be positioned at any other position of the exhaust system 104, including upstream of the DPF 106, within the DPF 106, between the DPF 106 and the decomposition chamber 108, within the decomposition chamber 108, between the decomposition chamber 108 and the SCR catalyst 110, within the SCR catalyst 110, or downstream of the SCR catalyst 110. In addition, two or more sensors 112 may be utilized for detecting a condition of the exhaust gas, such as two, three, four, five, or six sensors 112 with each sensor 112 located at one of the aforementioned positions of the exhaust system 104.

The dosing module 114 includes a dosing lance assembly 126. The dosing lance assembly 126 includes a delivery conduit (e.g., delivery pipe, delivery hose, etc.). The delivery conduit is fluidly coupled to the reductant pump 120. The dosing lance assembly 126 includes at least one injector. The injector is configured to dose the reductant into the exhaust gases (e.g., within the decomposition chamber 108, etc.). While not shown, it is understood that the dosing module 114 may include a plurality of injectors.

III. External Cover for Particulate Matter Sensor

Figure 2:
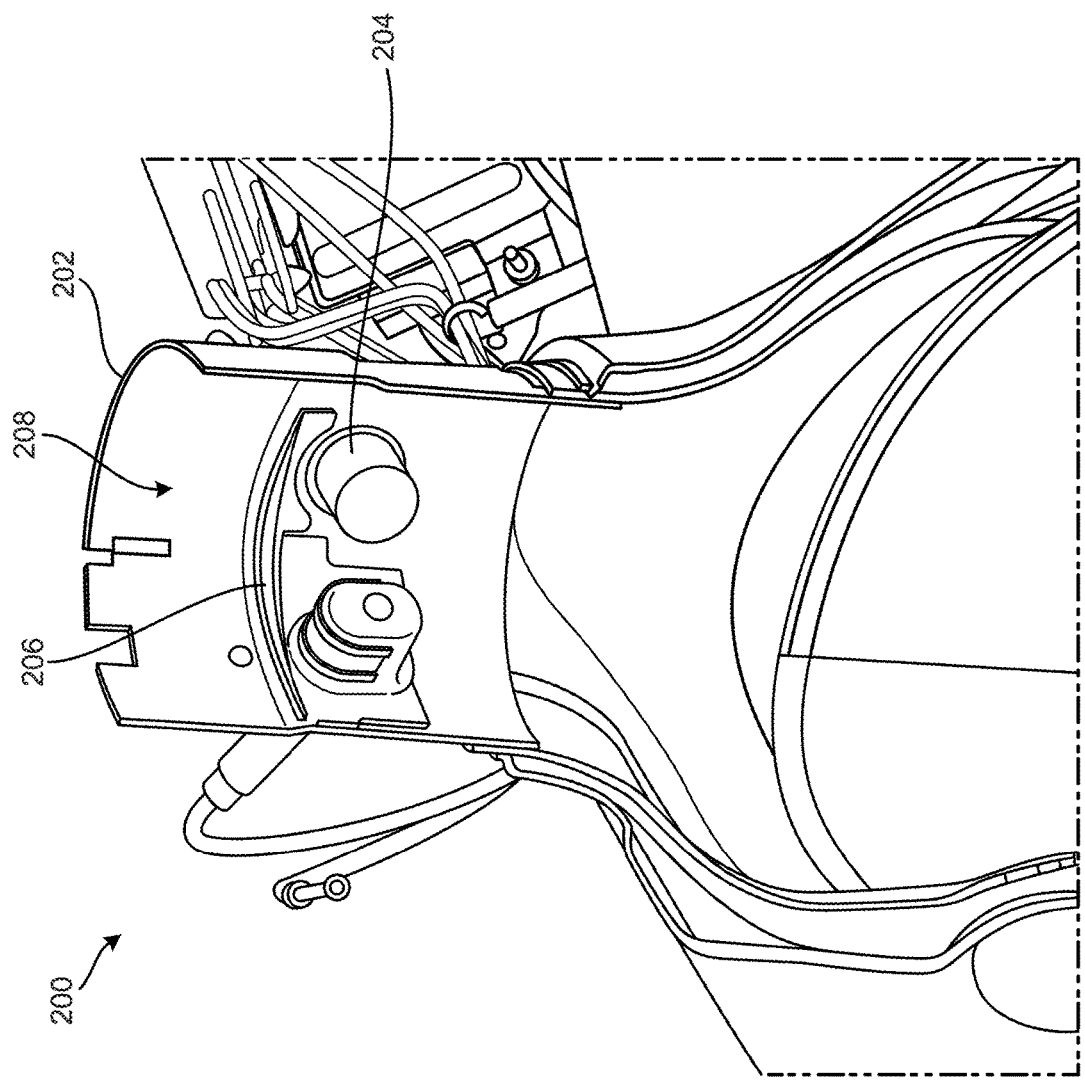
FIG. 2 is a cross-sectional view of an example particulate matter sensor with a water intrusion cover installed in an aftertreatment system.

FIG. 2 illustrates an example cross-sectional view of an exhaust pipe assembly 200. The exhaust pipe assembly 200 is shown to include a substantially vertically-oriented exhaust pipe 202 (e.g., oriented at an angle of 90±10 degrees with respect to gravity), an external cover 204 for a particulate matter sensor, and a rain shield 206. The rain shield 206 can be a substantially plate-like component that is affixed to an interior surface of the exhaust pipe 202 and is situated over the external cover 204 to protect the particulate matter sensor against water or other fluid flowing in a direction indicated by arrow 208. Although the rain shield 206 provides some amount of protection against fluid intrusion to the particulate matter sensor, contours of the rain shield 206 may permit fluid to drip along an edge of the rain shield 206 and into the particulate matter sensor below. Since water entering the exhaust pipe 202 can often include semiconductive contaminants from tail pipe corrosion that can result in failure-inducing deposits on the sensor, it is desirable to minimize fluid ingress to the particulate matter sensor as much as possible. Therefore, the external cover 204 includes multiple additional features optimized to protect against fluid intrusion and prevent any degradation in pressure drop, acoustics, or sensor functionality, as described in further detail with reference to the Figures that follow.

Figure 3:
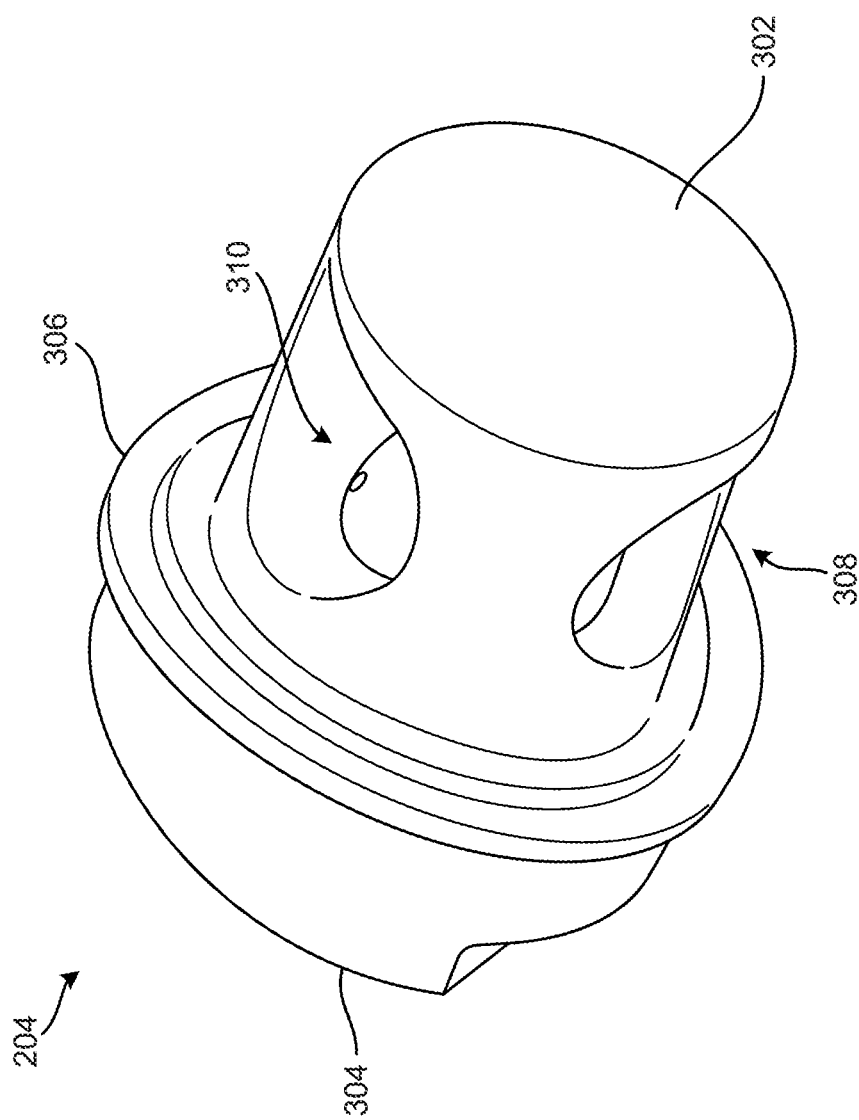
FIG. 3 is a perspective view of the example water intrusion cover of FIG. 2.
Figure 4:
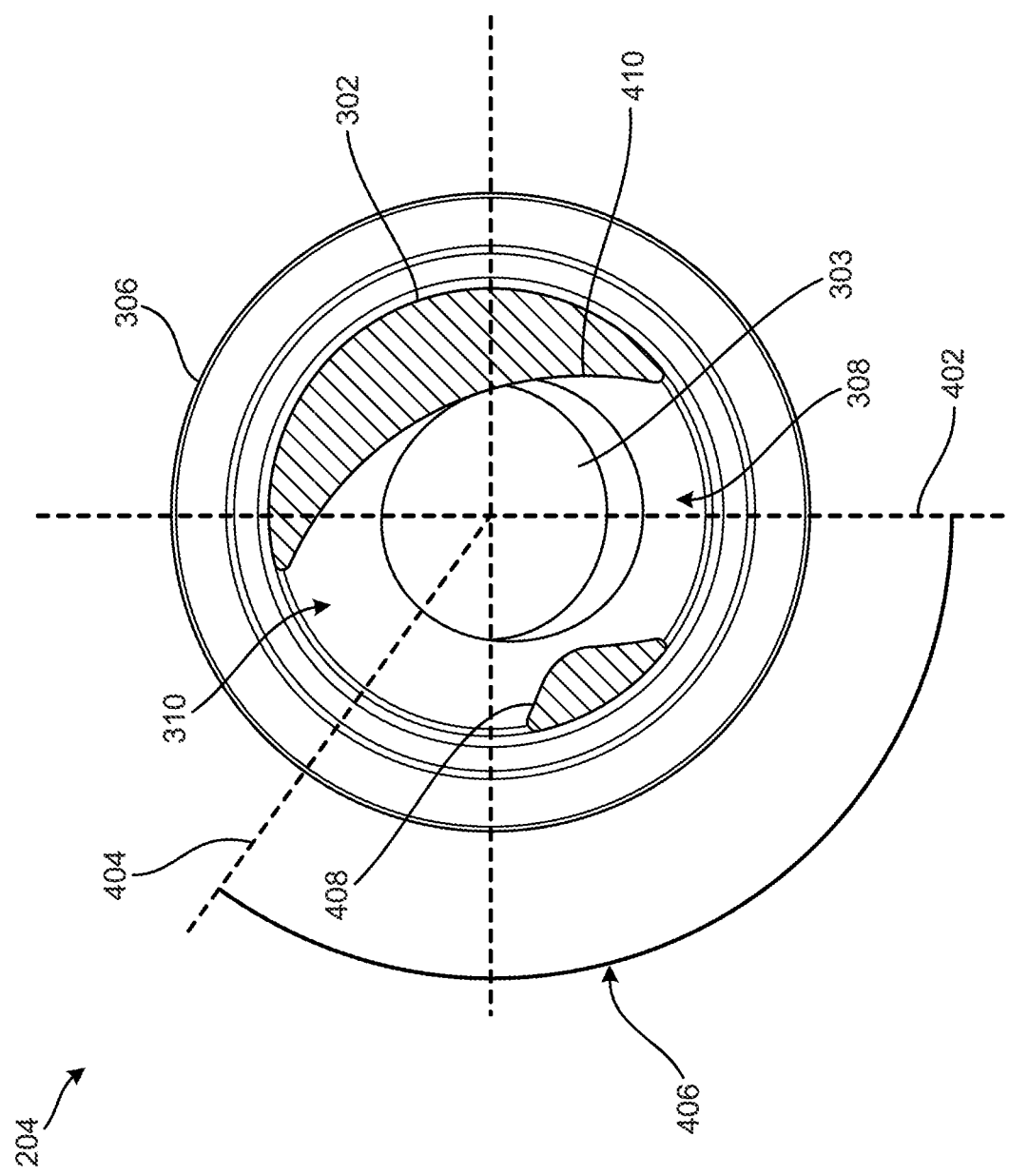
FIG. 4 is a front cross-sectional view of the example water intrusion cover of FIG. 2.

Referring to FIGS. 3 and 4, views of the water intrusion cover 204 are shown. Specifically, FIG. 3 depicts a perspective view of the cover 204, while FIG. 4 depicts a front cross-sectional view of the cover 204. Cover 204 is shown to include a main body portion 302, a shoulder portion 304, and a mounting flange 306 situated between the main body portion 302 and the shoulder portion 304. Main body portion 302, shoulder portion 304, and mounting flange 306 may be integrally formed or otherwise coupled to each other using any suitable method. Both the main body portion 302 and the shoulder portion 304 can be a substantially cylindrical shape that collectively define a central passage 303 for a particulate matter sensor to be inserted into the cover 204 such that a tip of the sensor resides within the main body portion 302. In other implementations, the main body portion 302 and shoulder portion 304 may have any geometry required to accommodate the insertion of the sensor. Shoulder portion 304 may include internal threads used to couple the particulate matter sensor to the cover 204. Mounting flange 306 may be utilized to couple the cover 204 to an exhaust pipe to retain the assembled particulate matter sensor and cover 204 within an exhaust pipe assembly. In an exemplary implementation, cover 204 is fabricated from stainless steel (e.g., A351 CF8M austenitic stainless steel). In other implementation, cover 204 is fabricated from a different material.

Main body portion 302 is further shown to include an inlet opening 308 and an outlet opening 310 formed in a sidewall of the main body portion 302. Inlet opening 308 and outlet opening 310 are fluidly coupled to form a continuous flow path for exhaust gases through the main body portion 302. Referring specifically to FIG. 4, an angle 406 extending between a centerline 402 of the inlet opening 308 and a centerline 404 of the outlet opening 310 can be in a range of 110 degrees to 120 degrees, although angle 406 may be modified based on the application in which cover 204 is installed. In an exemplary embodiment and as depicted in FIG. 4, angle 406 is about 115 degrees. When installed within an exhaust pipe assembly, the centerline 402 of the inlet opening 308 may be positioned parallel to the exhaust gas flow in order to direct the flow straight to the sensor tip and maintain a uniform gas flow.

As described below with reference to FIGS. 7 and 8, angle 406 may be selected based on the orientation of the rain shield 206 relative to the water intrusion cover 204 when installed in the exhaust pipe assembly. In other implementations, the inlet opening 308 and the outlet opening 310 may be situated at a different angle 406 based on the particular characteristics (e.g., shape of rain shield, exhaust pipe diameter) of the exhaust pipe assembly. In an exemplary embodiment, a cross-sectional area of the inlet opening 308 is smaller than a cross-sectional area of the outlet opening 310. This results in an increase in exhaust gas velocity as the gas travels from the inlet 308 to the outlet 310 and minimizes recirculation of gas within main body portion 302. Ensuring sufficient gas velocity may be required for proper sensor functionality. In applications where the velocity increase of exhaust gases is not required or is of less importance, both the inlet opening 308 and the outlet opening 310 may have the same cross-sectional area.

Still referring to FIG. 4, the cross-sectional view of the cover 204 (i.e., a cross-section perpendicular to an axis of the main body portion 302) is further shown to include a curved first surface 408 and a curved second surface 410. The first surface 408 and the second surface 410 bound the flow path for exhaust gases entering the cover 204 such that the flow path curves from the inlet opening 308 to the outlet opening 310.

Figure 6:
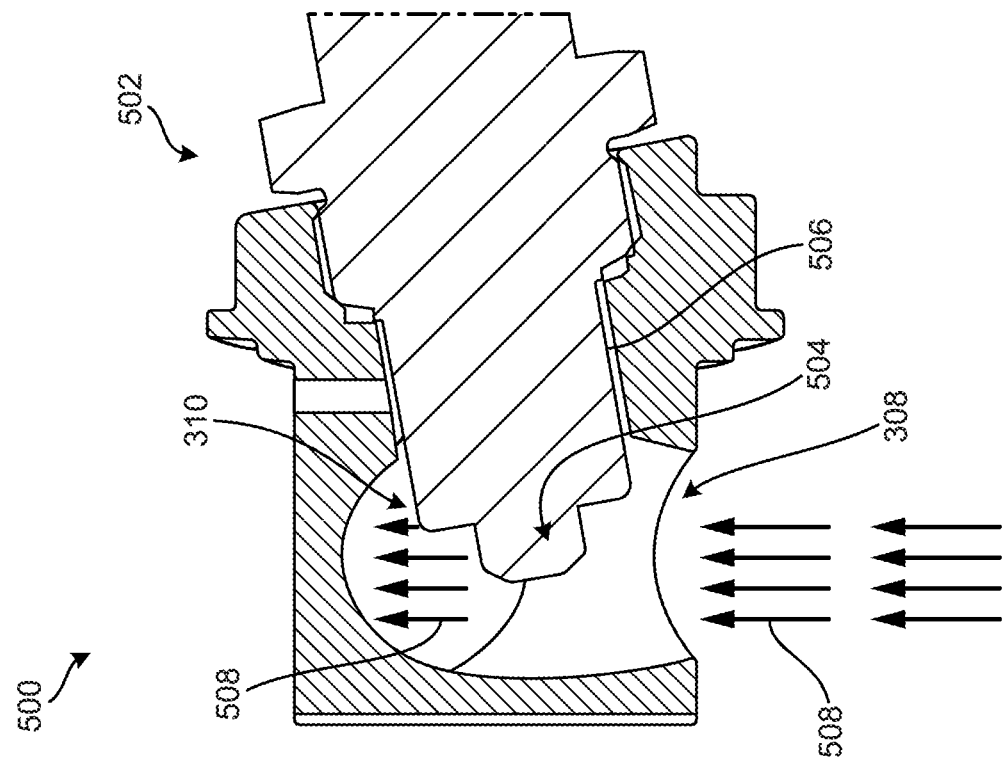
FIG. 6 is a side cross-sectional view of the example water intrusion cover of FIG. 2 installed on an example particulate matter sensor probe.
Figure 5:
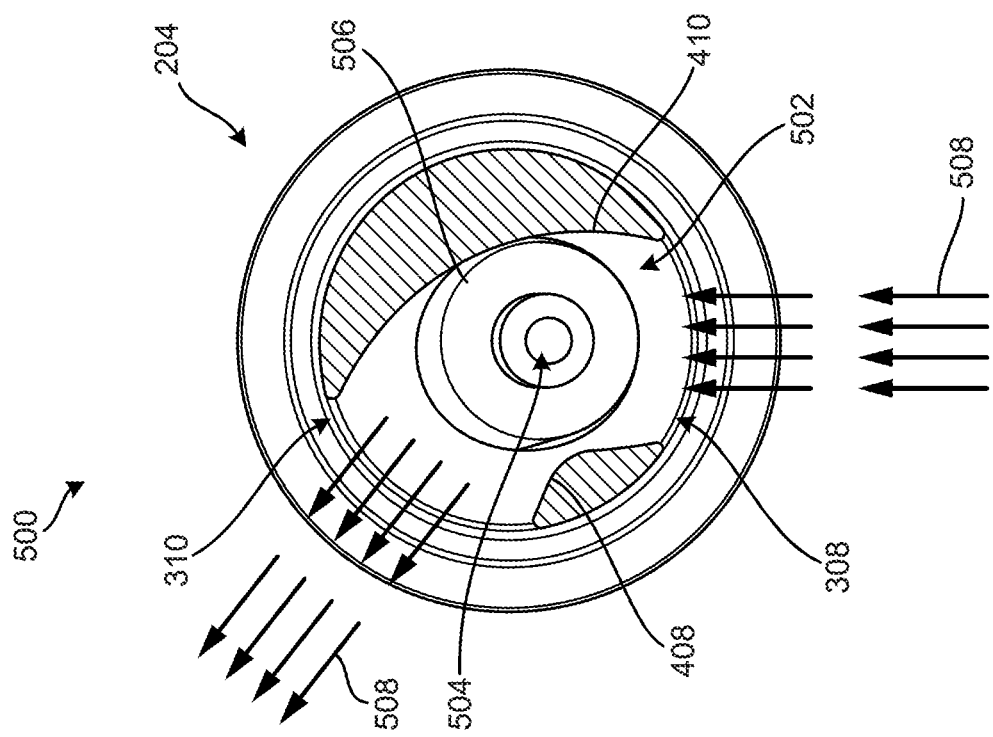
FIG. 5 is a front cross-sectional view of the example water intrusion cover of FIG. 2 installed on an example particulate matter sensor probe.

FIGS. 5 and 6 depict front and side cross-sectional views of a sensor assembly 500. Sensor assembly 500 is shown to include the water intrusion cover 204 coupled to a sensor 502 (e.g., a particulate matter sensor). The sensor 502 includes, among other components, a sensor tip 504 and a sensor body 506. When inserted into the cover 204, sensor 502 may be positioned such that the sensor tip 504 is substantially centered within the flow path of an exhaust gas 508. The exhaust gas 508 enters the cover 204 through inlet opening 308, travels along the curved flow path bounded by the first surface 408 and the second surface 410, and exits through outlet opening 310. Centering the sensor tip 504 within the flow path of the exhaust gas 508 results in optimal functioning of the sensor 502.

Figure 8:
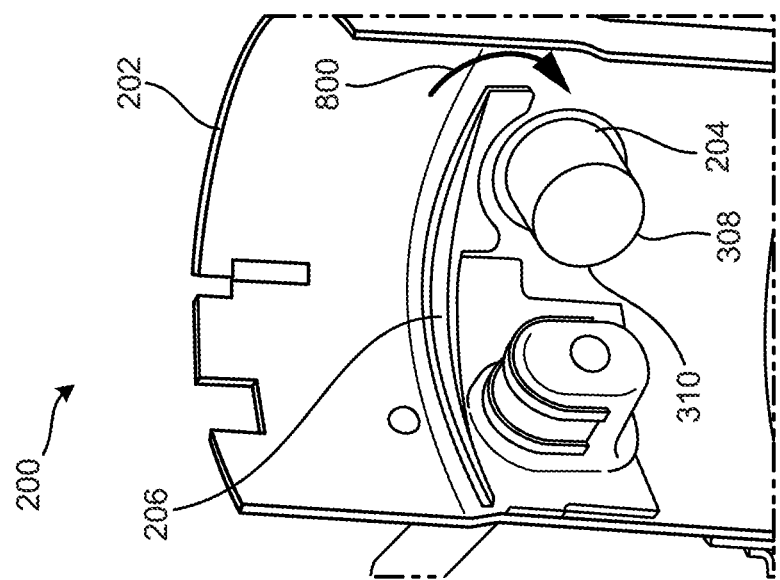
FIG. 8 is another cross-sectional view of the example particulate matter sensor of FIG. 2 with a water intrusion cover installed in an aftertreatment system.
Figure 7:
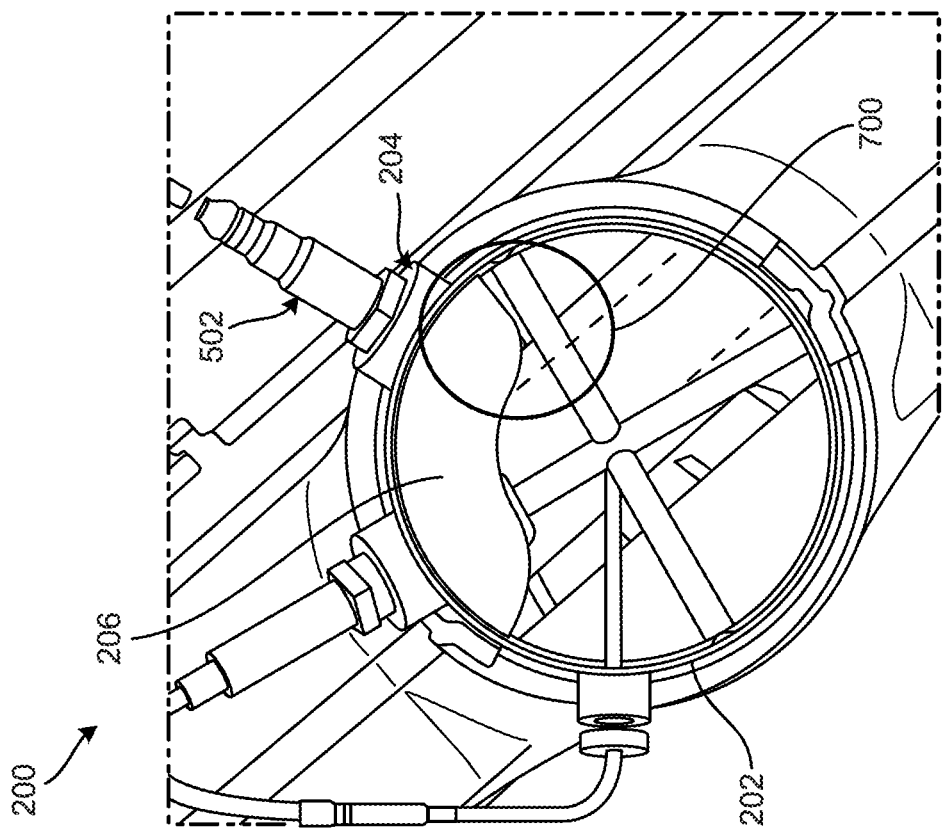
FIG. 7 is a top view of the example particulate matter sensor of FIG. 2 with a water intrusion cover installed in an aftertreatment system.

Referring now to FIGS. 7 and 8, a top view and a cross-sectional view of the exhaust pipe assembly 200 are respectively shown. As described above, the exhaust pipe assembly 200 includes, among other components, an exhaust pipe 202, a water intrusion cover 204 coupled to a particulate matter sensor 502, and a rain shield 206. A particular area of concern for water intrusion to the sensor 502 may be the region 700 between the exhaust pipe 202 and the rain shield 206. As shown in FIG. 8, water, which falls on rain shield 206, may follow flow path 800 and drip onto cover 204. However, due to the orientations of the inlet opening 308 and the outlet opening 310, fluid flowing along flow path 800 is unlikely to reach the sensor tip housed within the cover 204.

Figure 10:
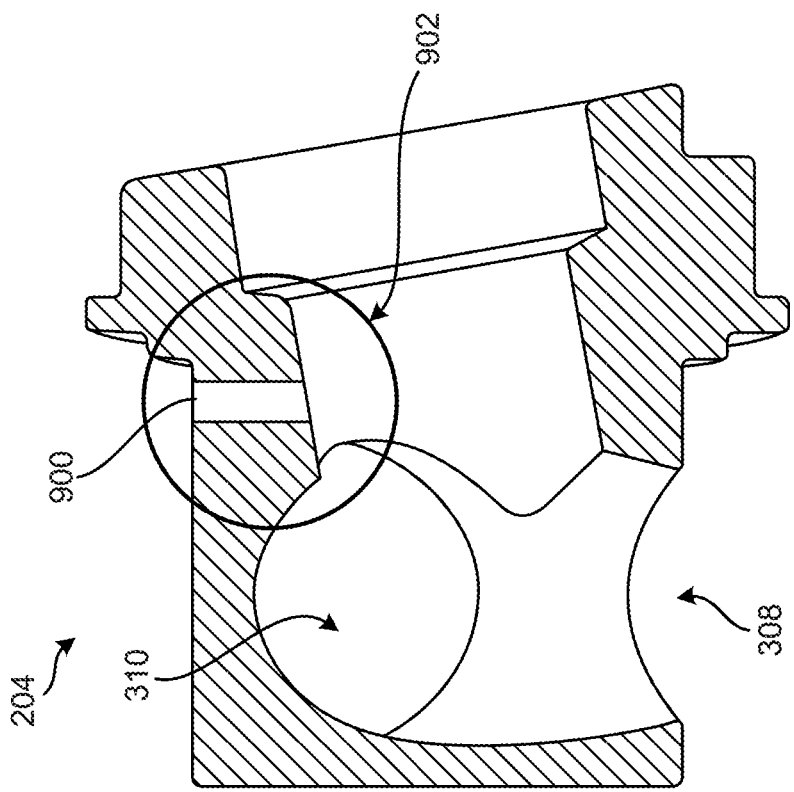
FIG. 10 is another side cross-sectional view of the example water intrusion cover of FIG. 2.
Figure 9:
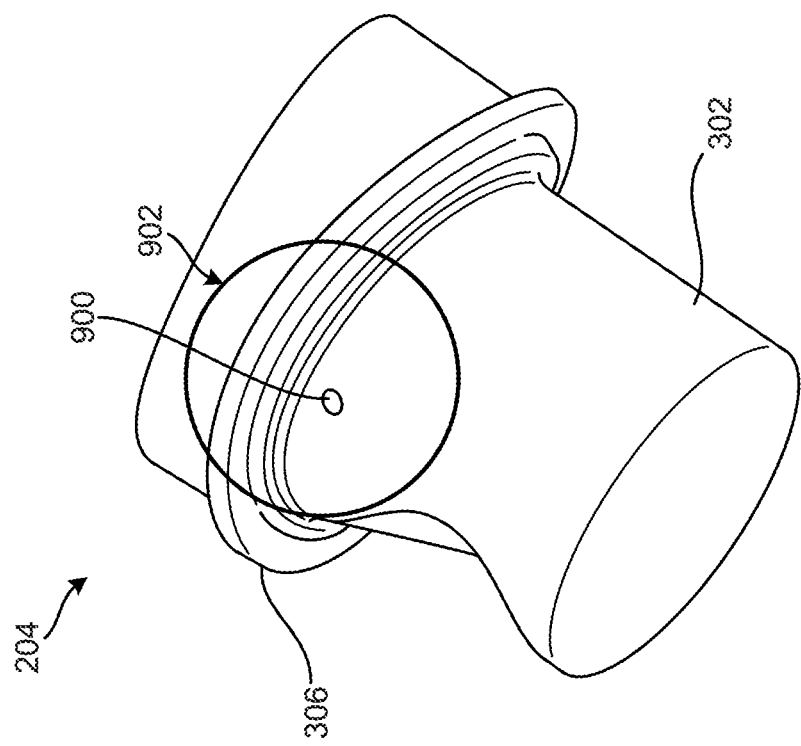
FIG. 9 is another perspective view of the example water intrusion cover of FIG. 2.
Figure 11:
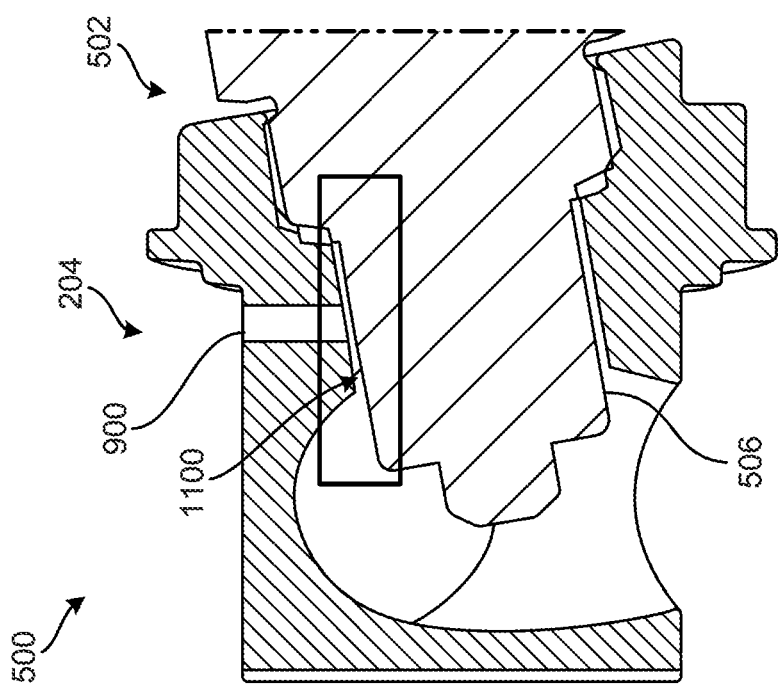
FIG. 11 is another side cross-sectional view of the example water intrusion cover of FIG. 2 installed on an example particulate matter sensor probe.

Turning now to FIGS. 9 and 10, additional perspective and side cross-sectional views of the water intrusion cover 204 are respectively depicted. In addition to the inlet 308 and outlet 310 formed in the sidewall of the main body portion 302, cover 204 can include a relief hole 900 located in a region 902 of the main body portion 302. In an exemplary implementation, region 902 is positioned opposite the inlet opening 308. In other words, the centerline of the inlet opening 308 and a centerline of the relief hole 900 are substantially parallel. In other implementations, cover 204 may include multiple relief holes, or a relief hole positioned in a different orientation relative to the inlet opening 308. As shown in the side cross-sectional view of the sensor assembly 500 in FIG. 11, relief hole 900 is configured to provide an exit flow path for any exhaust gases trapped in a region 1100 between the sensor body 506 and the water intrusion cover 204.

Figure 12:
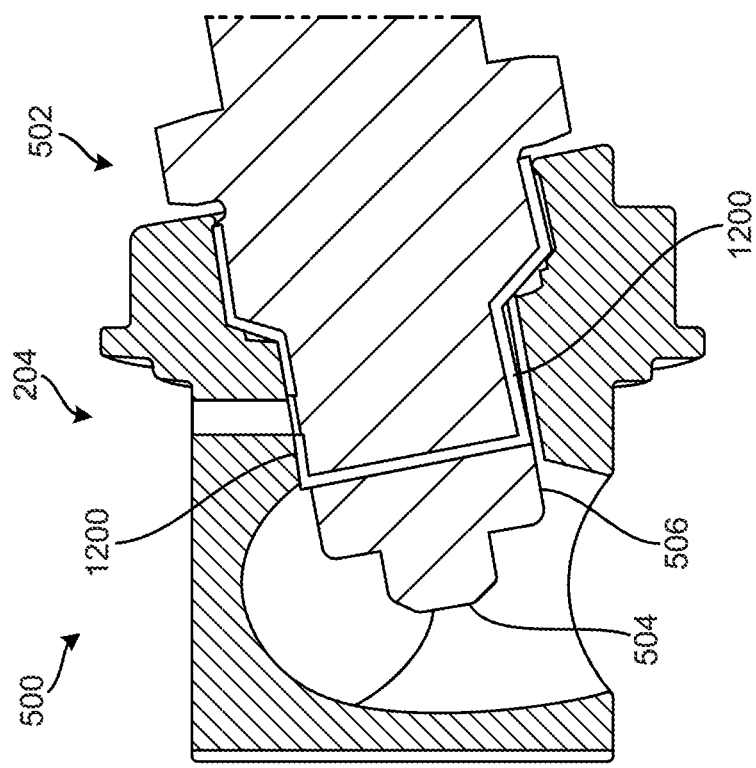
FIG. 12 is another side cross-sectional view of the example water intrusion cover of FIG. 2 installed on an example particulate matter sensor probe.

FIG. 12 depicts another side cross-sectional view of the sensor assembly 500 illustrating an advantage of the water intrusion cover 204. As shown by the highlighted outline 1200, a majority of the sensor body 506 is in contact with the cover 204. As such, because only the sensor tip 504 and a small portion of the sensor body 506 are exposed to the exhaust gas flow, only those portions of the sensor 502 are at risk of exposure to fluid intrusion, and thus the majority of the sensor 502 is protected from failure due to fluid intrusion.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," "fastened," "fixed," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "fluidly communicable with," and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A water intrusion cover for a sensor probe in an exhaust system, the water intrusion cover comprising:
    a shoulder portion having a substantially cylindrical outer shape; and
    a main body portion having a substantially cylindrical outer shape, the main body portion including an inlet opening, an outlet opening, and a curved bore extending transversely through a sidewall of the main body portion from the inlet opening to the outlet opening, wherein the bore is configured to receive a flow of exhaust gas; and
    wherein a centerline of the outlet opening forms an angle with respect to a centerline of the inlet opening; and
    wherein the main body portion and the shoulder portion collectively define a central passage configured to receive the sensor probe.

2. The water intrusion cover of claim 1, further comprising a mounting flange integrally coupled to the main body portion and the shoulder portion and situated between the main body portion and the shoulder portion.

3. The water intrusion cover of claim 1, wherein a cross-sectional area of the inlet opening is less than a cross-sectional area of the outlet opening.

4. The water intrusion cover of claim 1, wherein a cross-sectional area of the inlet opening is equal to a cross-sectional area of the outlet opening.

5. The water intrusion cover of claim 1, wherein the angle between the centerline of the inlet opening and the centerline of the outlet opening is at least 110 degrees and at most 120 degrees.

6. The water intrusion cover of claim 1, wherein the main body portion further comprises a relief hole formed through the sidewall of the main body portion.

7. The water intrusion cover of claim 6, wherein a centerline of the relief hole is substantially parallel to the centerline of the inlet opening.

8. An exhaust pipe assembly, comprising:
    an exhaust pipe; and
    a sensor assembly configured to be coupled to a wall of the exhaust pipe, the sensor assembly comprising a water intrusion cover comprising:
        a shoulder portion having a substantially cylindrical outer shape, and
        a main body portion having a substantially cylindrical outer shape, the main body portion including an inlet opening, an outlet opening, and a curved bore extending transversely through a sidewall of the main body portion from the inlet opening to the outlet opening, wherein the bore is configured to receive a flow of exhaust gas, and
        wherein a centerline of the outlet opening forms an angle with respect to a centerline of the inlet opening, and
        wherein the main body portion and the shoulder portion collectively define a central passage configured to receive a sensor probe.

9. The exhaust pipe assembly of claim 8, wherein the water intrusion cover further comprises a mounting flange integrally coupled to the main body portion and the shoulder portion and situated between the main body portion and the shoulder portion.

10. The exhaust pipe assembly of claim 8, wherein a cross-sectional area of the inlet opening is less than a cross-sectional area of the outlet opening.

11. The exhaust pipe assembly of claim 8, wherein a cross-sectional area of the inlet opening is equal to a cross-sectional area of the outlet opening.

12. The exhaust pipe assembly of claim 8, wherein the angle between the centerline of the inlet opening and the centerline of the outlet opening is at least 110 degrees and at most 120 degrees.

13. The exhaust pipe assembly of claim 8, wherein the main body portion further comprises a relief hole formed through the sidewall of the main body portion.

14. The exhaust pipe assembly of claim 13, wherein a centerline of the relief hole is substantially parallel to the centerline of the inlet opening.

15. The exhaust pipe assembly of claim 8, further comprising:
- a rain shield coupled to an interior surface of the exhaust pipe above the water intrusion cover.

16. The exhaust pipe assembly of claim 8, wherein the exhaust pipe is configured to be oriented substantially vertically with respect to gravity.

17. An aftertreatment system for treating constituents of an exhaust gas generated by an engine, the aftertreatment system comprising:
- an exhaust pipe assembly, comprising:
  - an exhaust pipe; and
  - a water intrusion cover coupled to a wall of the exhaust pipe, the water intrusion cover comprising:
    - a shoulder portion having a substantially cylindrical outer shape, and
    - a main body portion having a substantially cylindrical outer shape, the main body portion including an inlet opening, an outlet opening, and a curved bore extending transversely through a sidewall of the main body portion from the inlet opening to the outlet opening, wherein the bore is configured to receive a flow of exhaust gas, and
    - wherein a centerline of the outlet opening forms an angle with respect to a centerline of the inlet opening, and
    - wherein the main body portion and the shoulder portion collectively define a central passage;
- a sensor disposed through the central passage such that at least a tip of the sensor is disposed within the main body portion; and
- a selective catalytic reduction catalyst disposed in the exhaust pipe.

18. The aftertreatment system of claim 17, wherein the water intrusion cover is disposed downstream of the selective catalytic reduction catalyst.

* * * * *